United States Patent
Harris et al.

(10) Patent No.: US 10,217,979 B2
(45) Date of Patent: Feb. 26, 2019

(54) CONTAINMENT SYSTEM AND METHOD FOR HIGH ENERGY DENSITY DEVICES

(71) Applicant: The Boeing Company, Chicago, IL (US)

(72) Inventors: John N. Harris, Seattle, WA (US); Daniel B. Slaton, Renton, WA (US)

(73) Assignee: The Boeing Company, Chicago, IL (US)

( * ) Notice: Subject to any disclaimer, the term of this patent is extended or adjusted under 35 U.S.C. 154(b) by 464 days.

(21) Appl. No.: 14/616,817

(22) Filed: Feb. 9, 2015

(65) Prior Publication Data

US 2016/0359154 A1     Dec. 8, 2016

(51) Int. Cl.
*H01M 2/00* (2006.01)
*H01M 2/10* (2006.01)
(Continued)

(52) U.S. Cl.
CPC ........ *H01M 2/1094* (2013.01); *H01G 4/0085* (2013.01); *H01G 11/08* (2013.01);
(Continued)

(58) Field of Classification Search
CPC ............. H01M 2/1094; H01M 10/625; H01M 10/658; H01M 10/689; H01M 8/04067; H01M 8/0662; H01M 10/0525; H01M 2/0262; H01M 2/0287; H01M 8/02; H01M 10/659; H01M 8/2475; H01M 2/1072; H01M 2250/20; H01M 2220/20; H01M 10/48; H01M 10/052; H01G 11/08; H01G 11/14; H01G 11/18; H01G 11/78; Y02E 60/122; Y02T 90/32

See application file for complete search history.

(56) References Cited

U.S. PATENT DOCUMENTS 7,712,605 B2 * 5/2010 Suzuki ................. F17C 11/005
                                              165/104.12
2011/0064997 A1 * 3/2011 Peskar ................ H01M 2/1022
                                              429/185

(Continued)

FOREIGN PATENT DOCUMENTS

DE    10 2012 017 190         3/2014
JP    WO 2012081173 A1 *   6/2012  ............ H01M 2/105

OTHER PUBLICATIONS

Machine translation of WO2012081173A1 obtained Dec. 20, 2016.*

(Continued)

*Primary Examiner* — Nicholas P D'Aniello
(74) *Attorney, Agent, or Firm* — Walters & Wasylyna LLC

(57) ABSTRACT

A containment system including a primary containment layer at least partially defining a primary containment volume, the primary containment layer including a thermal material, a secondary containment layer at least partially defining a secondary containment volume, the secondary containment layer including a gas capturing material, wherein the primary containment layer is positioned in the secondary containment volume, and a tertiary containment layer at least partially defining a tertiary containment volume, the tertiary containment layer including a ballistic material, wherein the secondary containment layer is positioned in the tertiary containment volume.

39 Claims, 15 Drawing Sheets

(51) Int. Cl.
    *H01M 8/2475*     (2016.01)
    *H01M 10/659*     (2014.01)
    *H01M 10/658*     (2014.01)
    *H01M 10/625*     (2014.01)
    *H01G 11/08*     (2013.01)
    *H01G 11/14*     (2013.01)
    *H01G 11/18*     (2013.01)
    *H01G 11/78*     (2013.01)
    *H01M 2/02*     (2006.01)
    *H01M 8/02*     (2016.01)
    *H01M 8/04007*     (2016.01)
    *H01M 8/0662*     (2016.01)
    *H01M 10/0525*     (2010.01)
    *H01G 4/008*     (2006.01)
    *H01M 10/052*     (2010.01)
    *H01M 10/48*     (2006.01)

(52) U.S. Cl.
    CPC ............. *H01G 11/14* (2013.01); *H01G 11/18* (2013.01); *H01G 11/78* (2013.01); *H01M 2/0262* (2013.01); *H01M 2/0287* (2013.01); *H01M 2/1072* (2013.01); *H01M 8/02* (2013.01); *H01M 8/04067* (2013.01); *H01M 8/0662* (2013.01); *H01M 8/2475* (2013.01); *H01M 10/0525* (2013.01); *H01M 10/625* (2015.04); *H01M 10/658* (2015.04); *H01M 10/659* (2015.04); *H01M 10/052* (2013.01); *H01M 10/48* (2013.01); *H01M 2220/20* (2013.01); *H01M 2250/20* (2013.01); *Y02E 60/122* (2013.01); *Y02T 90/32* (2013.01)

(56) References Cited

U.S. PATENT DOCUMENTS

| | | | |
|---|---|---|---|
| 2012/0263981 A1* | 10/2012 | Norden | A62C 99/0009 |
| | | | 429/53 |
| 2014/0057148 A1* | 2/2014 | Damon | B60L 11/1879 |
| | | | 429/99 |
| 2015/0135940 A1* | 5/2015 | Rawlinson | F41H 7/042 |
| | | | 89/36.08 |

OTHER PUBLICATIONS

Makrolon Hygard (R) Product Data Sheet, Nov. 2011.*
"D3O® Cases—Tech21 Intelligent Impact Protection," Tech21 Impactology, www.tech21.com (2014).
"How D3O Works," www.d3o.com (2015).
German Patent and Trademark Office, "Office Action," with English translation, App. No. 10 2016 101 718.3 (dated Aug. 23, 2018).

* cited by examiner

CONTAINMENT SYSTEM AND METHOD FOR HIGH ENERGY DENSITY DEVICES

FIELD

This application relates to high energy density devices, such as lithium ion batteries, and, more particularly, to systems and methods for containing such high energy density devices in the event of malfunction, such as thermal runaway.

BACKGROUND

Rechargeable batteries are used in a variety of applications, such as onboard aircraft and in electronic devices (e.g., computers and mobile telephones). While various types of rechargeable batteries are available in the marketplace, lithium-ion batteries, such as lithium cobalt oxide ($LiCoO_2$) batteries, are commonly used due to their relatively high energy density and lack of battery memory after a partial charge.

Lithium-ion batteries are known to generate heat, both under load and during charging. Therefore, when a battery application benefits from the high energy density provided by lithium-ion batteries, thermal management is commonly employed. One example of thermal management of lithium-ion batteries involves physically separating the various cells of the lithium-ion battery. Another example of thermal management of lithium-ion batteries involves housing the lithium-ion battery in a vessel capable of withstanding high pressures. Another example of thermal management involves monitoring the temperature of each cell of the lithium-ion battery such that any cells experiencing overheating may be shut down.

Despite advances already made, those skilled in the art continue with research and development efforts in the field of lithium-ion battery containment.

SUMMARY

In one embodiment, the disclosed containment system may include a primary containment layer at least partially defining a primary containment volume, the primary containment layer including a thermal material, a secondary containment layer at least partially defining a secondary containment volume, the secondary containment layer including a gas capturing material, wherein the primary containment layer is positioned in the secondary containment volume, and a tertiary containment layer at least partially defining a tertiary containment volume, the tertiary containment layer including a ballistic material, wherein the secondary containment layer is positioned in the tertiary containment volume.

In another embodiment, the disclosed containment system may include a primary containment layer at least partially defining a primary containment volume, the primary containment layer including a thermal material, and a secondary containment layer at least partially defining a secondary containment volume, the secondary containment layer including a gas capturing material, wherein the primary containment layer is positioned in the secondary containment volume.

In another embodiment, the disclosed containment system may include a primary containment layer at least partially defining a primary containment volume, the primary containment layer including a thermal material, and a tertiary containment layer at least partially defining a tertiary containment volume, the tertiary containment layer including a ballistic material, wherein the primary containment layer is positioned in the tertiary containment volume.

In another embodiment, the disclosed containment system may include a secondary containment layer at least partially defining a secondary containment volume, the secondary containment layer including a gas capturing material, and a tertiary containment layer at least partially defining a tertiary containment volume, the tertiary containment layer including a ballistic material, wherein the secondary containment layer is positioned in the tertiary containment volume.

In another embodiment, the disclosed containment system may include a primary containment layer at least partially defining a primary containment volume, the primary containment layer including a thermal material, and a high energy density device at least partially received in the primary containment volume.

In another embodiment, the disclosed containment system may include a secondary containment layer at least partially defining a secondary containment volume, the secondary containment layer including a gas capturing material, and a high energy density device at least partially received in the secondary containment volume.

In another embodiment, the disclosed containment system may include a tertiary containment layer at least partially defining a tertiary containment volume, the tertiary containment layer including a ballistic material, and a high energy density device at least partially received in the tertiary containment volume.

In another embodiment, the disclosed containment system may include a primary containment layer at least partially defining a primary containment volume, wherein the primary containment layer includes a phase change material and a carrier, wherein the phase change material is supported by the carrier, a secondary containment layer at least partially defining a secondary containment volume, wherein the primary containment layer is positioned in the secondary containment volume, and wherein the secondary containment layer includes a gas permeable layer, a gas impermeable layer and a gas capturing material positioned between the gas permeable layer and the gas impermeable layer, and a tertiary containment layer at least partially defining a tertiary containment volume, wherein the secondary containment layer is positioned in the tertiary containment volume, and wherein the tertiary containment layer includes a liner material and a dilatant material connected to the liner material.

In yet another embodiment, the disclosed containment method may include the steps of (1) providing a high energy density device; (2) enclosing, at least partially, the high energy density device within a primary containment layer comprising a thermal material; (3) enclosing the primary containment layer within a secondary containment layer comprising a gas capturing material; and (4) enclosing the secondary containment layer within a tertiary containment layer comprising a ballistic material.

Other embodiments of the disclosed containment system and method for high energy density devices will become apparent from the following detailed description, the accompanying drawings and the appended claims.

DETAILED DESCRIPTION

Figure 1:
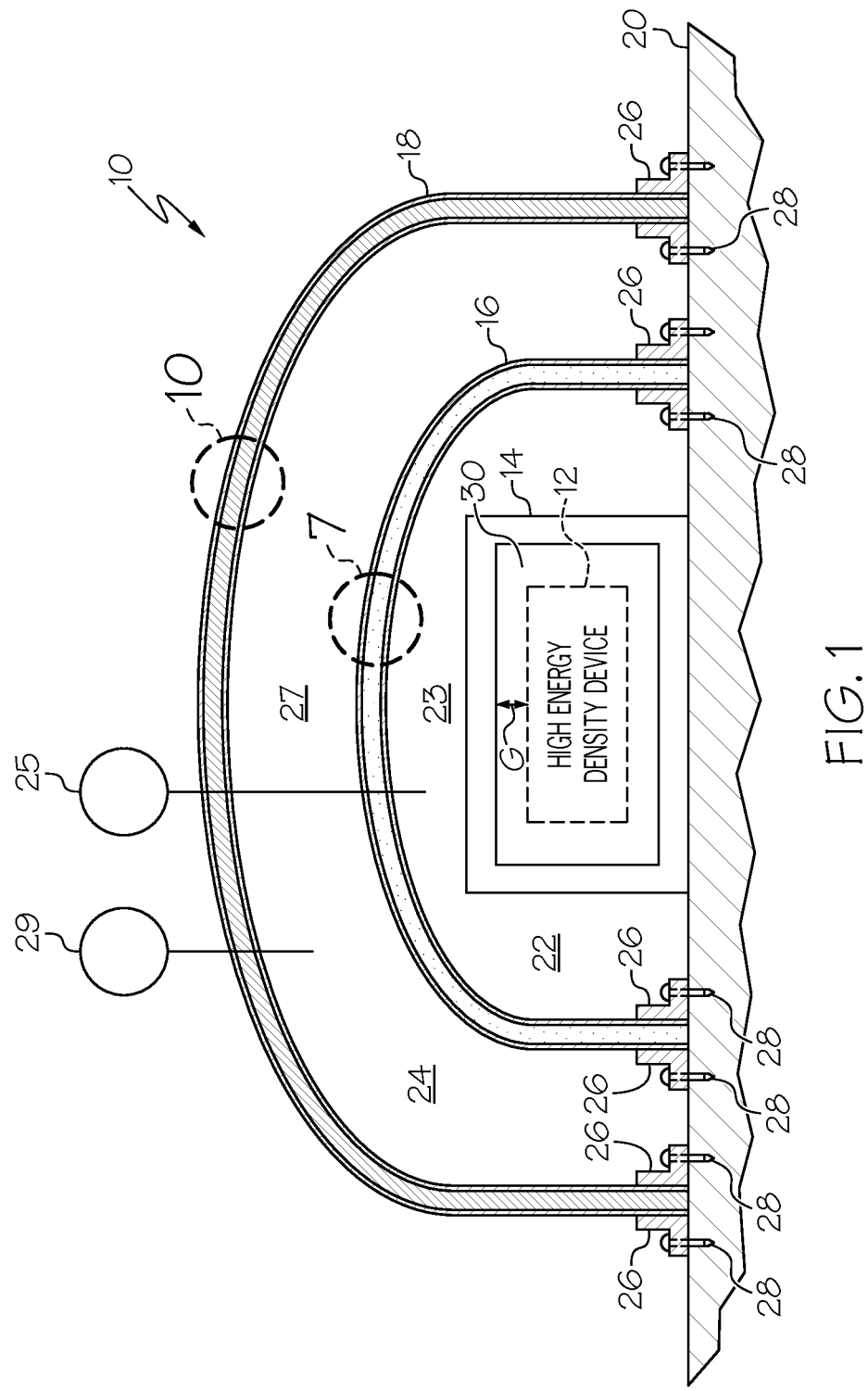
FIG. 1 is a schematic cross-sectional view of one embodiment of the disclosed containment system for high energy density devices.

Referring to FIG. 1, disclosed is one embodiment of a containment system, generally designated 10, for a high energy density device 12. The high energy density device 12 may be positioned within the containment system 10. Therefore, the containment system 10 may contain, at least partially, heat, gases, liquids and/or solids (e.g., particles or bulk pieces) emanating from the high energy density device 12.

As used herein, "high energy density device" broadly refers to any electrical energy source that yields, whether by storage or generation, a relatively high amount of electrical energy per unit volume (or mass) of the device. As one non-limiting example, the high energy density device 12 may be a battery, such as a lithium-ion battery. As another non-limiting example, the high energy density device 12 may be a fuel cell, such as a proton exchange membrane fuel cell or a solid oxide fuel cell. As yet another non-limiting example, the high energy density device 12 may be a supercapacitor.

The containment system 10 includes a primary containment layer 14, a secondary containment layer 16, and/or a tertiary containment layer 18. The secondary containment layer 16 may be positioned within the tertiary containment layer 18. The primary containment layer 14 may be positioned within the secondary containment layer 16. The high energy density device 12 may be positioned within the primary containment layer 14.

While a containment system 10 having three containment layers (the primary containment layer 14, the secondary containment layer 16 and the tertiary containment layer 18) is shown and described, one or more additional containment layers may be incorporated into the containment system 10 without departing from the scope of the present disclosure. An additional containment layer may have the same (or similar) functionality as the primary containment layer 14, the secondary containment layer 16 or the tertiary containment layer 18. Alternatively, the functionality of the additional layer may be different from the functionality of the primary, secondary and tertiary containment layers 14, 16, 18.

Furthermore, while a containment system 10 having three containment layers (the primary containment layer 14, the secondary containment layer 16 and the tertiary containment layer 18) is shown and described, advantage may be gained by using a containment system 10 having fewer than the three disclosed containment layers 14, 16, 18. Such a modification will not result in a departure from the scope of the present disclosure. For example, in one variation, the containment system 10 includes only the primary containment layer 14 and the secondary containment layer 16. In another variation, the containment system 10 includes only the primary containment layer 14 and the tertiary containment layer 18. In another variation, the containment system 10 includes only the secondary containment layer 16 and the tertiary containment layer 18. In yet another variation, the containment system 10 includes only one containment layer, such as only the primary containment layer 14, only the secondary containment layer 16, or only the tertiary containment layer 18.

As is shown in FIG. 1, the disclosed containment system 10 may be mounted to a base structure 20. For example, one or more of the containment layers 14, 16, 18 of the containment system 10 may be connected to the base structure 20. The base structure 20 may be a floor, such as the cargo floor of an aircraft, or may be a structure particularly designated for use with the high energy density device 12, such a mounting base, a plate, a bracket or a board.

In one particular construction, the disclosed containment system 10 may be mounted to the base structure 20 by way of the secondary and tertiary containment layers 16, 18. For example, the secondary containment layer 16 may be fixedly connected to the base structure 20 such that both the secondary containment layer 16 and the base structure 20 define a secondary containment volume 22, which may include the primary containment layer 14 and the high energy density device 12. Furthermore, the tertiary containment layer 18 may be fixedly connected to the base structure 20 such that both the tertiary containment layer 18 and the base structure 20 define a tertiary containment volume 24, which may include the secondary containment layer 16, the primary containment layer 14 and the high energy density device 12.

The connections between the base structure 20 and the secondary and tertiary containment layers 16, 18 may be made with mechanical fasteners, adhesives and the like. For example, brackets 26 (e.g., L-shaped brackets) and bolts 28 may be used to connect the secondary and tertiary containment layers 16, 18 to the base structure 20. Optionally, a sealing material (not shown), such as a gasket or sealant, may be positioned between the base structure 20 and the secondary and tertiary containment layers 16, 18 to ensure a gas-tight connection therebetween.

Alternatively, rather than the base structure 20 defining at least a portion of the secondary containment volume 22 and the tertiary containment volume 24 of the containment system 10, the containment volumes 22, 24 may be fully defined by the containment system 10. For example, the secondary containment volume 22 may be fully defined by the secondary containment layer 16 and the tertiary containment volume 24 may be fully defined by the tertiary containment layer 18.

Still referring to FIG. 1, the high energy density device 12 may be at least partially enclosed within the primary containment layer 14. Therefore, the primary containment layer 14 may at least partially define a primary containment volume 30 and the high energy density device 12 may be at least partially received within the primary containment volume 30.

There may be a gap G between the high energy density device 12 and the primary containment layer 14. The gap G may be filled with ambient air, though introducing other materials into the gap G, such as thermal insulation or a thermally conductive material, is also contemplated. While a gap G is shown in FIG. 1, steps may be taken to minimize (if not eliminate) the gap G. For example, the high energy density device 12 may be closely received within the primary containment layer 14.

The primary containment layer 14 may assume various configurations. As one example, the primary containment layer 14 may be configured as a sleeve that may be received over at least a portion of the high energy density device 12. As another example, the primary containment layer 14 may be configured as a wrap that may be wrapped around at least a portion of the high energy density device 12. As yet another example, the primary containment layer 14 may be configured as a container, such as a box, that may receive, at least partially, the high energy density device 12.

Figure 2:
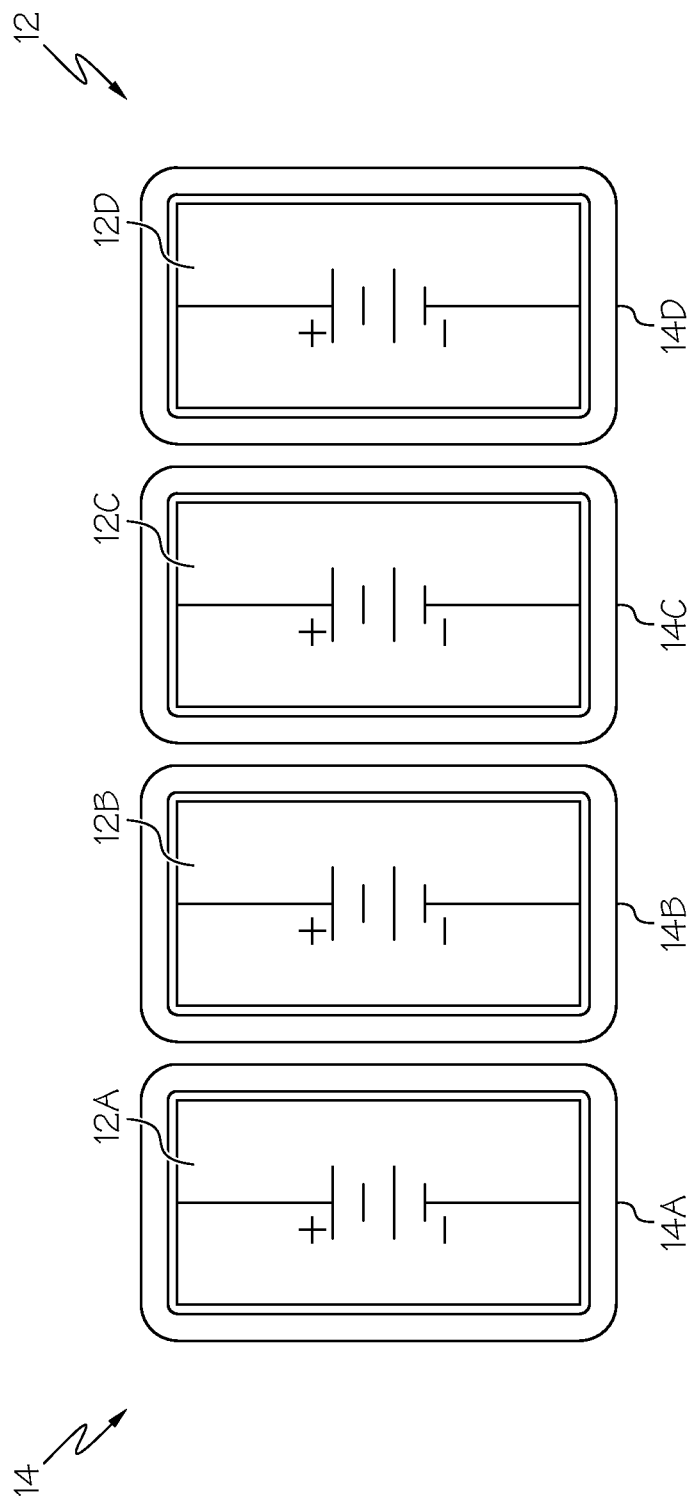
FIG. 2 is a top plan view of the primary containment layer of the containment system of FIG. 1, shown applied to a high energy density device having multiple cells.
Figure 3:
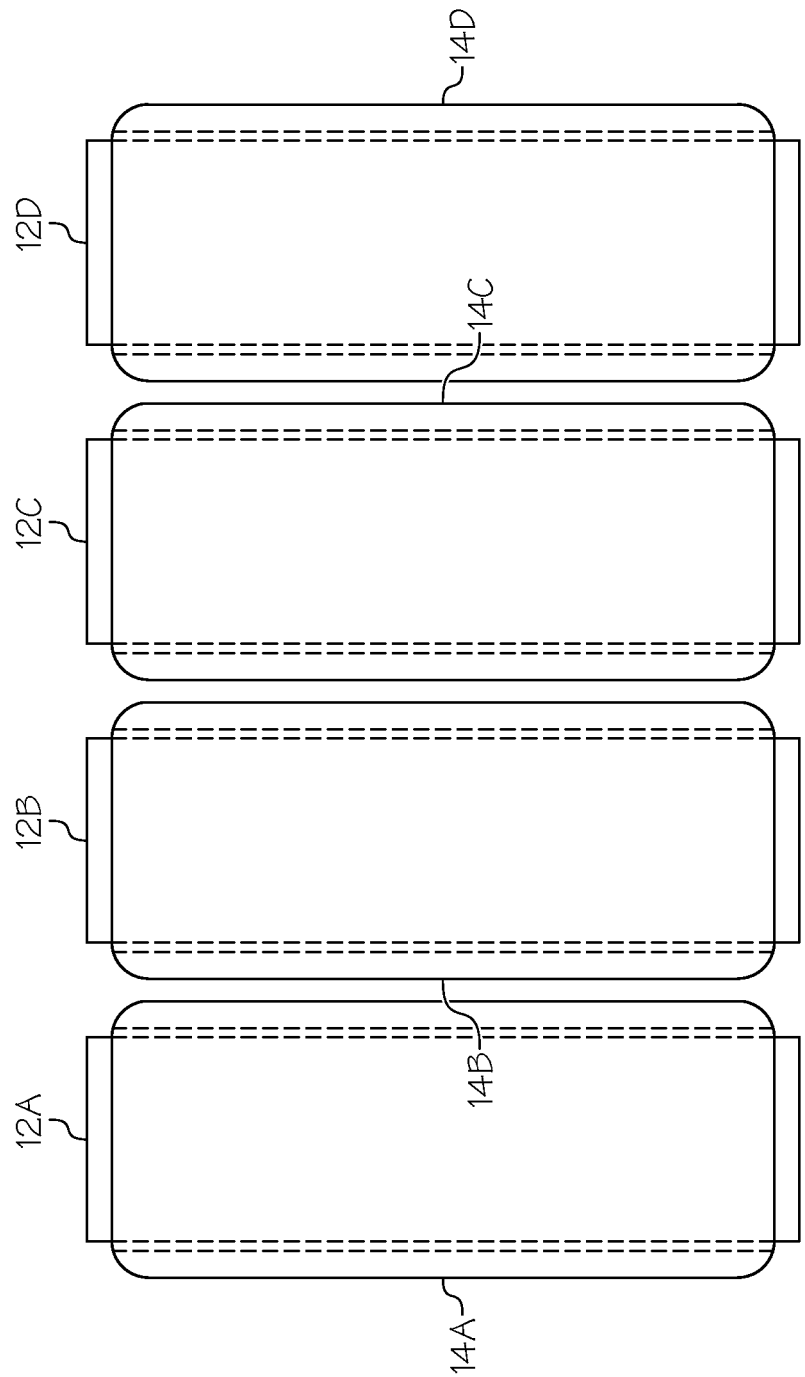
FIG. 3 is a side elevational view of the primary containment layer shown in FIG. 2.

Referring to FIGS. 2 and 3, in one particular application, the high energy density device 12, which is shown as a single block in FIG. 1, may have multiple subunits 12A, 12B, 12C, 12D. The subunits 12A, 12B, 12C, 12D may be electrically interconnected, such as in series or parallel. While four subunits 12A, 12B, 12C, 12D are shown in FIGS. 2 and 3, high energy density devices 12 with fewer than four subunits or more than four subunits may also be used.

When the high energy density device 12 has multiple subunits 12A, 12B, 12C, 12D, the primary containment layer 14 may include multiple primary containment units 14A, 14B, 14C, 14D. The number of primary containment units 14A, 14B, 14C, 14D may be substantially equal to the number of subunits 12A, 12B, 12C, 12D. Therefore, each subunit 12A, 12B, 12C, 12D of the high energy density device 12 may be enclosed within an associated primary containment unit 14A, 14B, 14C, 14D of the primary containment layer 14. Alternatively, the number of primary containment units 14A, 14B, 14C, 14D may be less than the number of subunits 12A, 12B, 12C, 12D. Therefore, two or more subunits 12A, 12B, 12C, 12D of the high energy density device 12 may be enclosed within the same primary containment unit 14A, 14B, 14C, 14D of the primary containment layer 14.

As one specific, non-limiting example, the high energy density device 12 may be a battery, such as a lithium-ion battery (e.g., a lithium cobalt oxide ($LiCoO_2$) battery). Therefore, the high energy density device 12 may include multiple electrically interconnected electrochemical cells (subunits) 12A, 12B, 12C, 12D. Each cell (subunit) 12A, 12B, 12C, 12D of the battery (high energy density device) 12 may be enclosed (e.g., wrapped) in an associated primary containment unit 14A, 14B, 14C, 14D of the primary containment layer 14.

The primary containment layer 14 may be formed from (or may include) a thermal material. Therefore, heat emanating from the high energy density device 12 may be transferred to the thermal material of the primary containment layer 14, such as by way of thermal conduction. The composition of the thermal material may be selected such that the primary containment layer 14 may absorb heat emanating from the high energy density device 12 without readily transferring the heat outside of the primary containment layer 14 (e.g., to the secondary containment layer 16 and beyond). Therefore, the primary containment layer 14 may function to contain heat emanating from the high energy density device 12.

When the high energy density device 12 includes multiple subunits 12A, 12B, 12C, 12D, as shown in FIGS. 2 and 3, the thermal material of the primary containment layer 14 may inhibit the transfer of heat emanating from one subunit of the high energy density device 12 to the other subunits. Therefore, the primary containment layer 14 may also function to thermally isolate from one another the various subunits 12A, 12B, 12C, 12D of the high energy density device 12.

In a first implementation, the thermal material of the primary containment layer 14 may be (or may include) a polymer, such a high temperature polymer. Therefore, the thermal material may impart the primary containment layer 14 with thermal insulation properties, while being capable of withstanding elevated temperatures.

A high temperature polymer suitable for use as the thermal material of the primary containment layer 14 may be capable of being heated to a temperature of at least about 100° C. without experiencing substantial softening of the polymer material. As one example, the high temperature polymer thermal material may be capable of being heated to a temperature of at least about 150° C. without experiencing substantial softening of the polymer material. As another example, the high temperature polymer thermal material may be capable of being heated to a temperature of at least about 200° C. without experiencing substantial softening of the polymer material. As another example, the high temperature polymer thermal material may be capable of being heated to a temperature of at least about 300° C. without experiencing substantial softening of the polymer material. As another example, the high temperature polymer thermal material may be a thermoplastic polymer having a glass transition temperature of at least about 100° C. As another example, the high temperature polymer thermal material may be a thermoplastic polymer having a glass transition temperature of at least about 125° C. As yet another example, the high temperature polymer thermal material may be a thermoplastic polymer having a glass transition temperature of at least about 150° C.

In a first expression of the first implementation, the thermal material of the primary containment layer 14 may be (or may include) a polyaryletherketone. Use of modified polyaryletherketones is also contemplated. Polyaryletherketones are thermoplastic polymers known to retain their strength at elevated temperatures. Indeed, various polyaryletherketone have been approved for use on, and are indeed used on, aircraft.

Various polyaryletherketones and related thermoplastic polymers may be used as the thermal material of the primary containment layer 14. As one specific, non-limiting example, the primary containment layer 14 may be formed from (or may include) polyetheretherketone (PEEK). As another specific, non-limiting example, the primary containment layer 14 may be formed from (or may include) polyetherketoneketone (PEKK). As another specific, non-limiting example, the primary containment layer 14 may be formed from (or may include) polyetherketone (PEK). As another specific, non-limiting example, the primary containment layer 14 may be formed from (or may include) polyetherketoneetherketoneketone (PEKEKK). As yet another specific, non-limiting example, the primary containment layer 14 may be formed from (or may include) polyetherimide (PEI).

In a second expression of the first implementation, the thermal material of the primary containment layer 14 may be (or may include) silicone, such as a high temperature silicone. High temperature silicones have relatively low thermal conductivities and, therefore, can contain within the primary containment layer 14 heat emanating from the high energy density device 12. Because high temperature silicones are capable of withstanding high temperatures, forming the primary containment layer 14 from high temperature silicone may ensure that the high energy density device 12 remains enclosed within the primary containment layer 14 at elevated temperatures.

Various high temperature silicones may be used as the thermal material of the primary containment layer 14. As one specific, non-limiting example, the primary containment layer 14 may be formed from (or may include) room temperature vulcanization (RTV) silicone. As another specific, non-limiting example, the primary containment layer 14 may be formed from (or may include) high temperature vulcanization (HTV) silicone. As another specific, non-limiting example, the primary containment layer 14 may be formed from (or may include) silicone foam.

The primary containment layer 14 may be formed from a polymeric thermal material using various techniques. As one example, the polymeric thermal material may be molded (e.g., by way of injection molding) to form a solid body having the desired shape and size (e.g., a container or sleeve sized to closely receive the high energy density device 12). As another example, the polymeric thermal material may be cast into a relatively thin sheet or film, and the sheet/film may be used to wrap the high energy density device 12. The sheet/film wrap may form the primary containment layer 14. As yet another example, the polymeric thermal material may initial be in liquid form, and the high energy density device 12 may be dipped in the polymeric thermal material, thereby forming a polymeric coating on the high energy density device 12. After curing, the polymeric coating may form the primary containment layer 14.

In a second implementation, the thermal material of the primary containment layer 14 may be (or may include) a phase change material. For example, the phase change material may be a solid at a temperature of 25° C. and a pressure of 1 atmosphere. As a temperature of the phase change material increases, the phase change material reaches its fusion point, where it begins to melt. Further heating will not increase the temperature of the phase change material until the phase change material has completely converted from a solid phase to a liquid phase. The amount of heat absorbed during the transition from solid to liquid will depend on the amount of phase change material being used as well as its heat of fusion. The heat of fusion of most phase change materials will fall between about 1000 kJ/kg and about 5 kJ/kg.

In a first expression of the second implementation, the thermal material of the primary containment layer 14 may be (or may include) an organic phase change material. As one non-limiting example, the phase change material-containing primary containment layer 14 may be formed from (or may include) paraffin. As another non-limiting example, the phase change material-containing primary containment layer 14 may be formed from (or may include) a fatty acid, such as a fatty acid having between 14 and 34 carbon atoms, and a melting point within the range of 5° C. to 76° C. As another non-limiting example, the phase change material-containing primary containment layer 14 may be formed from (or may include) phenol. As another non-limiting example, the phase change material-containing primary containment layer 14 may be formed from (or may include) beeswax. As another non-limiting example, the phase change material-containing primary containment layer 14 may be formed from (or may include) a quinone. As another non-limiting example, the phase change material-containing primary containment layer 14 may be formed from (or may include) benzoic acid. As yet another non-limiting example, the phase change material-containing primary containment layer 14 may be formed from (or may include) p-xylene dichloride.

In a second expression of the second implementation, the thermal material of the primary containment layer 14 may be (or may include) an inorganic phase change material. As one non-limiting example, the phase change material-containing primary containment layer 14 may be formed from (or may include) sodium silicate. As another non-limiting example, the phase change material-containing primary containment layer 14 may be formed from (or may include) lithium. As yet another non-limiting example, the phase change material-containing primary containment layer 14 may be formed from (or may include) sodium chloride.

Various commercially available phase change materials may be used as the thermal material of the primary containment layer 14. One suitable example is PureTemp-53, which is commercially available from Entropy Solutions, Inc., of Plymouth, Minn. Another suitable example is PureTemp-103, which is also commercially available from Entropy Solutions, Inc. Another suitable example is Climsel™ C70, which is commercially available from Climator Sweden AB of Skovde, Sweden. Yet another suitable example is PlusICE™ S89, which is commercially available from Phase Change Material Products Ltd. of Cambridgeshire, United Kingdom.

The phase change material itself may form the primary containment layer 14. For example, the primary containment layer 14 may be a container (e.g., a box) formed (e.g., molded) from beeswax that is capable of at least partially receiving the high energy density device 12. However, because the phase change material may undergo a phase change (e.g., solid to liquid), the phase change material may be supported by (e.g., on or in) a carrier. Various techniques may be used to support a phase change material in connection with the primary containment layer 14.

Figure 4:
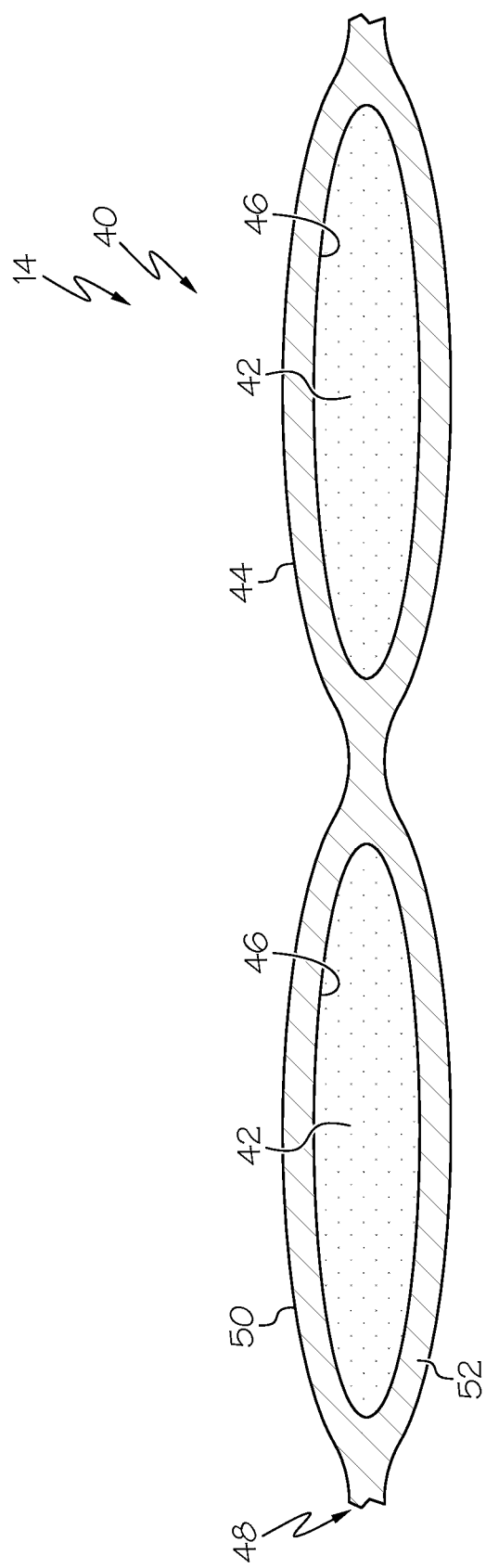
FIG. 4 is a cross-sectional view of one aspect of the primary containment layer of the containment system of FIG. 1.

Referring to FIG. 4, in one example construction, the primary containment layer 14 may be configured as a sheet 40 into which the phase change material 42 has been incorporated. The sheet 40 may include a carrier 44 and the phase change material 42 supported by the carrier 44. The carrier 44 may define pockets 46, which may be filled with the phase change material 42.

The carrier 44 may be constructed as a layered structure 48 that includes a first layer 50 connected to a second layer 52 to define the pockets 46 therebetween. The phase change material 42 may be contained within the pockets 46 defined by the carrier 44. As one general, non-limiting example, the first and second layers 50 of the layered structure 48 may be polymeric films that have been connected together, such as by lamination, heat sealing, with adhesives, or the like. Various polymeric films may be used. As one specific, non-limiting example, the first and second layers 50 of the layered structure 48 may be formed from polyethylene, and the first polyethylene layer 50 may be heat sealed to the second polyethylene layer 52 to define the pockets 46 and contain the phase change material 42 within the pockets 46.

Figure 5:
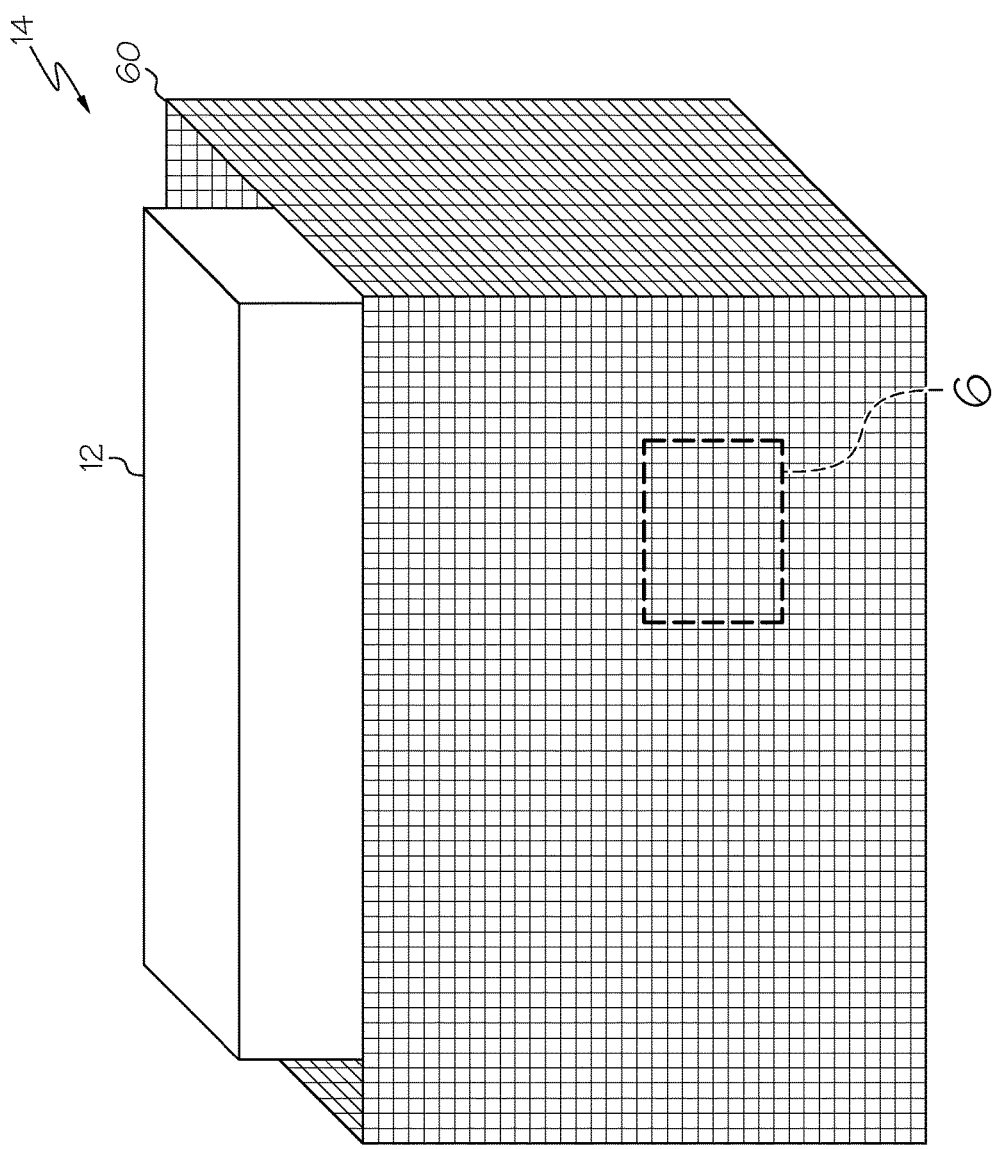
FIG. 5 is a perspective view of another aspect of the primary containment layer of the containment system of FIG. 1.
Figure 6:
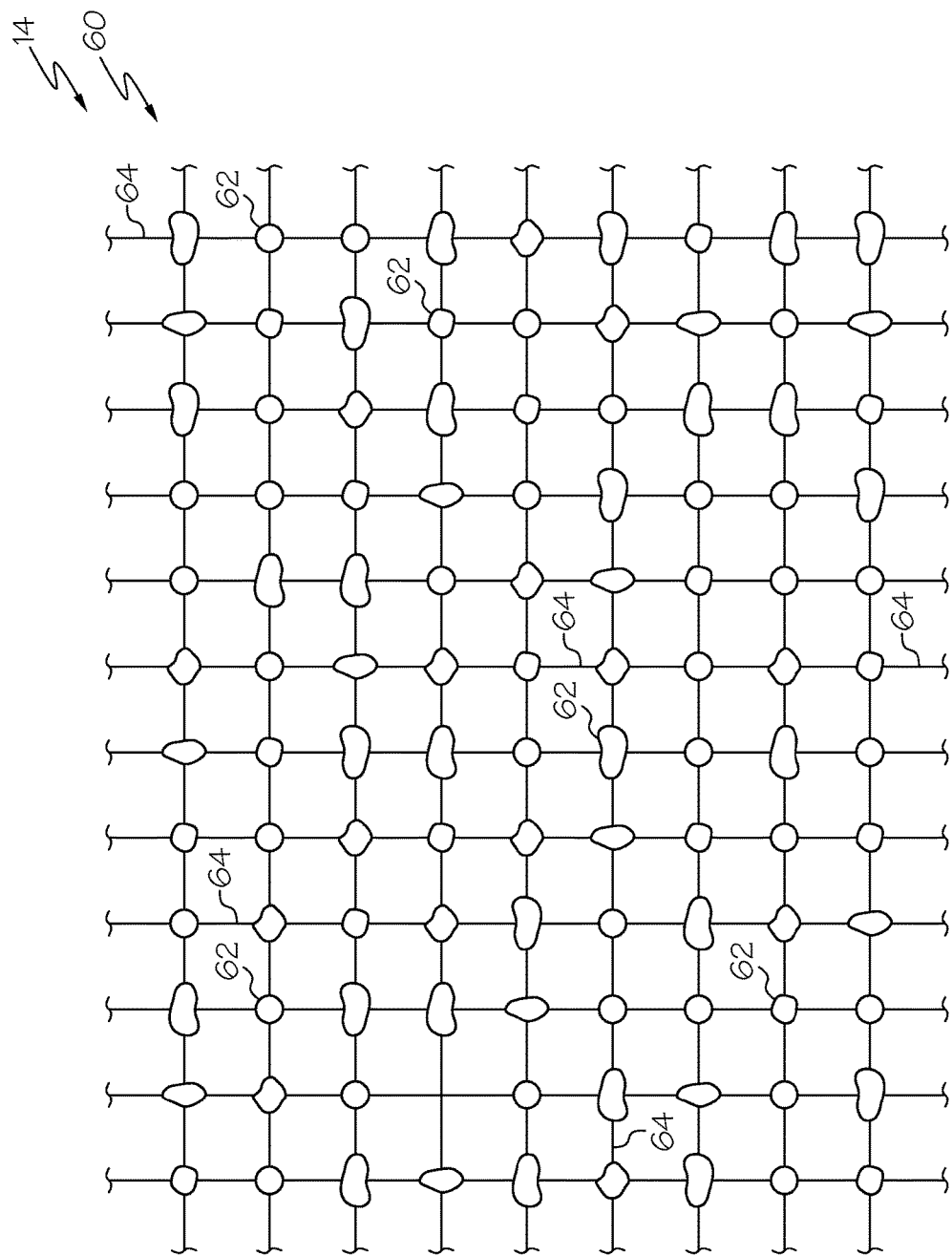
FIG. 6 is a close-up elevational view of the primary containment layer of FIG. 5.

Referring to FIGS. 5 and 6, in another example construction, the primary containment layer 14 may be configured as a body 60 onto which (or into which) the phase change material 62 (FIG. 6) has been incorporated. The body 60 may include a carrier 64 (FIG. 6) and the phase change material 62. The phase change material 62 may be supported by the carrier 64.

The carrier 64 may be a framework capable of supporting the phase change material 62, such as a rigid (or semi-rigid) framework. As one general, non-limiting example, the carrier 64 may be a mesh. The mesh may be formed from various materials, such as metals and/or metal oxides, thereby rendering the carrier 64 resistant to heat degradation. As one specific, non-limiting example, the carrier 64 may be a mesh formed from aluminum oxide ($AlO_2$). As another general, non-limiting example, the carrier 64 may be a fabric. The fabric may be formed from various materials, such as metal oxides and or high-temperature polymers. As another specific, non-limiting example, the carrier 64 may be an aluminum oxide ($AlO_2$) fabric.

Thus, the carrier 64 may define the shape of the body 60. As shown in FIG. 5, the body 60 may be configured as a container (e.g., a rectilinear container) sized and shaped to closely receive the high energy density device 12 therein. However, other configurations of the body 60 (e.g., sheets or patches that may be placed against the high energy density device 12) are also contemplated.

The phase change material 62 may be incorporated onto (or into) the carrier 64. As one non-limiting example, the phase change material 62 may be coated onto the carrier 64, as shown in FIG. 6. Coating of the carrier 64 may be achieved using various techniques, such as spraying, dipping or the like. As another non-limiting example, the phase change material 62 may be impregnated into the carrier 64, such as when the carrier 64 is formed from a porous or semi-porous material (e.g., a metal-oxide fabric). Impregnation of the carrier 64 with the phase change material 62 may be achieved using various techniques, such as soaking.

Referring back to FIG. 1, the high energy density device 12 and the primary containment layer 14 may be enclosed within the secondary containment layer 16. Therefore, the high energy density device 12 and the primary containment layer 14 may occupy a portion of the secondary containment volume 22 defined by the secondary containment layer 16. However, the secondary containment volume 22 may be greater than the volume of space occupied by the high energy density device 12 and the primary containment layer 14, thereby leaving an air space 23 between the primary containment layer 14 and the secondary containment layer 16.

Optionally, one or more sensors 25 may be positioned to sense the air space 23 of the secondary containment layer 16. As one example, the sensor 25 may be a gas sensor, such as a hydrogen sensor, a carbon dioxide sensor, a carbon monoxide sensor and/or a hydrocarbon sensor. As another example, the sensor 25 may be a temperature sensor. As yet another example, the sensor 25 may be a pressure sensor.

The secondary containment layer 16 may assume various configurations. As shown in FIG. 1, in one particular configuration, the secondary containment layer 16 may be constructed as a dome supported on the base structure 20. While the dome-shaped secondary containment layer 16 is shown in FIG. 1 with an arched cross-section, various alternative cross-sections are contemplated, such as circular (e.g., a hemispherical dome). Without being limited to any particular theory, a dome-shaped secondary containment layer 16 may have greater ballistic integrity than a secondary containment layer 16 having another non-dome configuration. That said, constructing the secondary containment layer 16 into a non-dome configuration would not result in a departure from the scope of the present disclosure.

The secondary containment layer 16 may be formed from (or may include) a gas capturing material. Therefore, certain gases (if not all gases) emanating from the high energy density device 12 may be captured by the secondary containment layer 16, such as by way of adsorption or absorption. The secondary containment layer 16 may be constructed such that gases emanating from the high energy density device 12 may enter the secondary containment layer 16 to be brought into contact with the gas capturing material, but may not pass beyond the secondary containment layer 16 (e.g., to the tertiary containment layer 18 and beyond). As such, the secondary containment layer 16 may function to contain gases emanating from the high energy density device 12.

Figure 7:
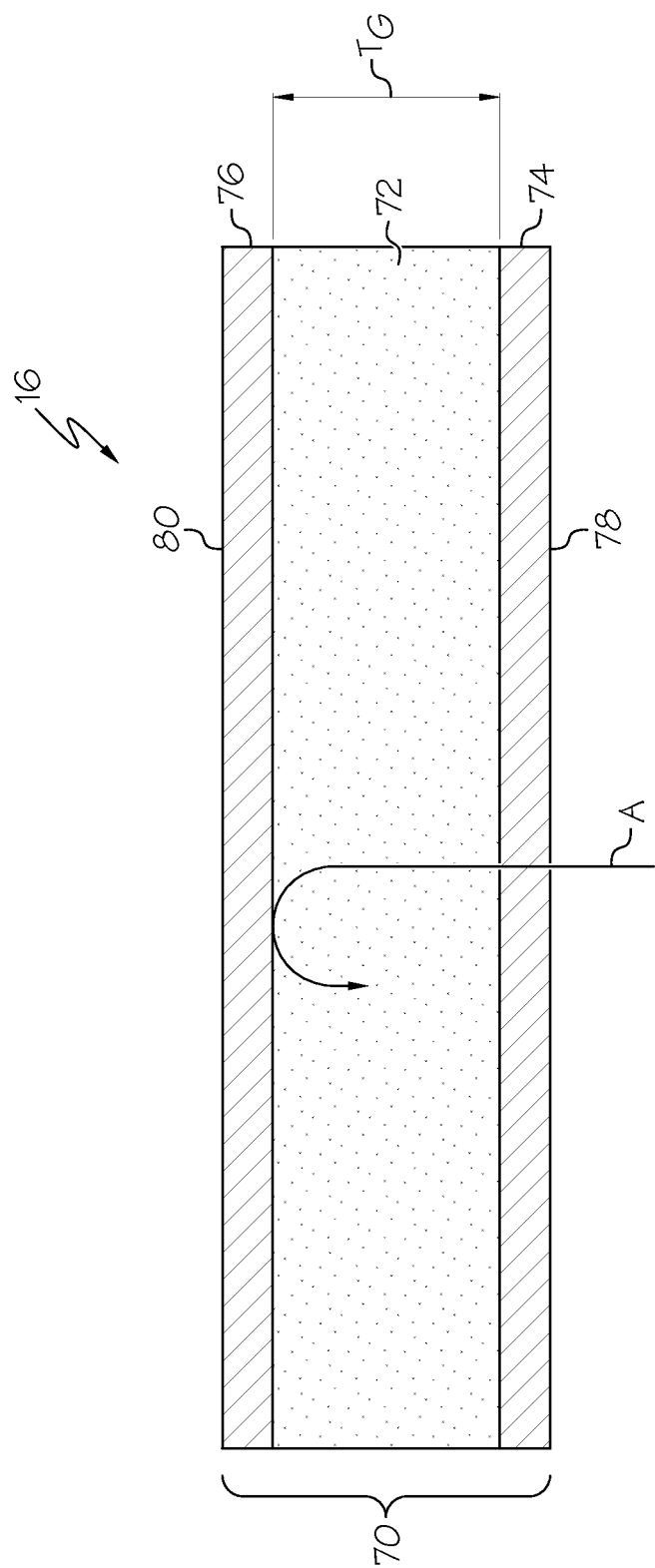
FIG. 7 is a cross-sectional view of the secondary containment layer of the containment system of FIG. 1.

Referring to FIG. 7, the secondary containment layer 16 may be formed as a layered structure 70 that may include the gas capturing material 72, a gas permeable layer 74 and a gas impermeable layer 76. The gas capturing material 72 may be positioned between the gas permeable layer 74 and the gas impermeable layer 76. The gas permeable layer 74 may define the inboard side 78 of the secondary containment layer 16, while the gas impermeable layer 76, may define the outboard side 80 of the secondary containment layer 16.

The cross-sectional thickness TG of the gas capturing material layer 72 may be a design consideration and may be dictated by various factors, such as the composition of the gas capturing material layer 72, the type of high energy density device 12 (FIG. 1) being used, and the overall size of the containment system 10, among other possible factors. For example, the cross-sectional thickness TG of the gas capturing material layer 72 may range from about 0.5 cm to about 15 cm, such as from about 1 cm to about 10 cm, or from about 2 cm to about 8 cm.

Additional layers may be included within the layered structure 70 of the secondary containment layer 16 without departing from the scope of the present disclosure. For example, in one variation, the layered structure 70 may include multiple, alternating gas permeable layers 74 and gas capturing material layers 72.

Thus, as shown by arrow A, gases emanating from the high energy density device 12 (FIG. 1) may pass into the layered structure 70 on the inboard side 78 of the secondary containment layer 16 by way of the gas permeable layer 74. Once inside the layered structure 70, the gases may come into contact with the gas capturing material 72. The gas impermeable layer 76 may inhibit (if not absolutely prevent) passage of gases outward from the outboard side 80 of the secondary containment layer 16.

Various materials may be used to form the gas permeable layer 74 of the layered structure 70 of the secondary containment layer 16. As one general, non-limiting example, the gas permeable layer 74 may be formed from (or may include) a fabric, such as a woven fabric or a non-woven fabric. As one specific, non-limiting example, the gas permeable layer 74 may be formed from (or may include) a fabric of metal oxide fibers. Those skilled in the art will appreciate that various metal oxide fibers are generally capable of withstanding elevated temperature without degradation. Suitable metal oxide fibers include, without limitation, alumina ($Al_2O_3$) fibers, silica ($SiO_2$) fibers, and titanium dioxide ($TiO_2$) fibers. As another general, non-limiting example, the gas permeable layer 74 may be formed from (or may include) a gas permeable polymeric film.

Likewise, various materials may be used to form the gas impermeable layer 76 of the layered structure 70 of the secondary containment layer 16. As one general, non-limiting example, the gas impermeable layer 76 may be formed from (or may include) a polymeric material. As one specific, non-limiting example, the gas impermeable layer 74 may be formed from (or may include) polyetheretherketone (PEEK). As another specific, non-limiting example, the gas impermeable layer 74 may be formed from (or may include) polyetherimide (PEI). As another specific, non-limiting example, the gas impermeable layer 74 may be formed from (or may include) polyurethane (TPU). As another specific, non-limiting example, the gas impermeable layer 74 may be formed from (or may include) polyphenyl sulphone (PPSU). As another general, non-limiting example, the gas impermeable layer 76 may be formed from (or may include) a metallic material. As another specific, non-limiting example, the gas impermeable layer 74 may be formed from (or may include) a metalized film (e.g., aluminum metalized polyethylene terephthalate or aluminum metalized polypropylene).

The gas capturing material 72 may be any material capable of capturing one or more of the gases that may emanate from the high energy density device 12 (FIG. 1), such during an operation transient of the high energy density device 12. Target gases include, without limitation, hydrogen, carbon dioxide and carbon monoxide, as well as various volatile organic compounds. Therefore, various modes of gas capture are contemplated.

In a first implementation, the gas capturing material 72 may be (or may include) an adsorbent (or a combination of adsorbents). The composition of the adsorbent gas capturing material 72 may be dictated by the gases that may emanate from the high energy density device 12 (FIG. 1). With proper material selection, gases emanating from the high energy density device 12 may pass into the layered structure 70 of the secondary containment layer 16 and may be adsorbed onto the gas capturing material 72.

The physical form of the adsorbent gas capturing material 72 may be dictated by the composition of the gas capturing material 72. The use of adsorbent particles, layered adsorbents, foams and the like is contemplated, but various other forms may be used without departing from the scope of the present disclosure.

In a first expression of the first implementation, the gas capturing material 72 may be (or may include) a hydrogen-selective adsorbent. One general, non-limiting example of a hydrogen-selective adsorbent is a metal-organic framework. One specific, non-limiting example of a metal-organic framework-based hydrogen-selective adsorbent is $Zn_4O$ (BBC)$_2$, wherein BBC is 4,4',4"-[benzene-1,3,5-triyl-tris(benzene-4,1-diyl)]tribenzoate. Another general, non-limiting example of a hydrogen-selective adsorbent is zeolite. One specific, non-limiting example of a zeolite-based hydrogen-selective adsorbent is mordenite. Another specific, non-limiting example of a zeolite-based hydrogen-selective adsorbent is faujasite.

In a second expression of the first implementation, the gas capturing material 72 may be (or may include) a carbon dioxide-selective adsorbent. One general, non-limiting example of a carbon dioxide-selective adsorbent is a metal-organic framework. One specific, non-limiting example of a metal-organic framework-based carbon dioxide-selective adsorbent is $Mg_2$(DOBDC), wherein DOBDC is 2,5-dioxido-1,4-benzenedicarboxylate. Another general, non-limiting example of a carbon dioxide-selective adsorbent is zeolite. One specific, non-limiting example of a zeolite-based carbon dioxide-selective adsorbent is zeolite 13X.

In a third expression of the first implementation, the gas capturing material 72 may be (or may include) a hydrocarbon-selective adsorbent. One general, non-limiting example of a hydrocarbon-selective adsorbent is a metal-organic framework. One specific, non-limiting example of a metal-organic framework-based $C_1$ to $C_{13}$ hydrocarbon-selective adsorbent is Fe-MOF-74. Another specific, non-limiting example of a metal-organic framework-based $C_1$ to $C_{13}$ hydrocarbon-selective adsorbent is Mg-MOF-74.

In a second implementation, the gas capturing material 72 may be an absorbent (or a combination of absorbents). The composition of the absorbent gas capturing material 72 may be dictated by the gases that may emanate from the high energy density device 12 (FIG. 1). With proper material selection, gases emanating from the high energy density device 12 may pass into the layered structure 70 of the secondary containment layer 16 and may be absorbed by the gas capturing material 72.

The physical form of the absorbent gas capturing material 72 may be dictated by the composition of the gas capturing material 72. The use of liquid absorbents is contemplated, but various other forms (e.g., solids) may be used without departing from the scope of the present disclosure.

In a first expression of the second implementation, the gas capturing material 72 may be (or may include) a liquid solvent, such as a liquid solvent for absorbing carbon dioxide. One general, non-limiting example of a carbon dioxide-absorbing liquid solvent is an amine. One specific, non-limiting example of an amine-based carbon dioxide-absorbing liquid solvent is monoethanolamine. Another general, non-limiting example of a carbon dioxide-absorbing liquid solvent is an alkaline solution. One specific, non-limiting example of an alkaline-based carbon dioxide-absorbing liquid solvent is sodium hydroxide. Another specific, non-limiting example of an alkaline-based carbon dioxide-absorbing liquid solvent is lithium hydroxide.

While the layered structure 70 is shown and described as a suitable means for incorporating a gas capturing material 72 into the secondary containment layer 16, various alternative techniques are also contemplated. For example, the gas capturing material 72 may be incorporated (e.g., dispersed) into a foam or other porous material, and a gas impermeable layer 76 may be layered over the foam to inhibit the passage of gases outside of the secondary containment layer 16.

Figure 8:
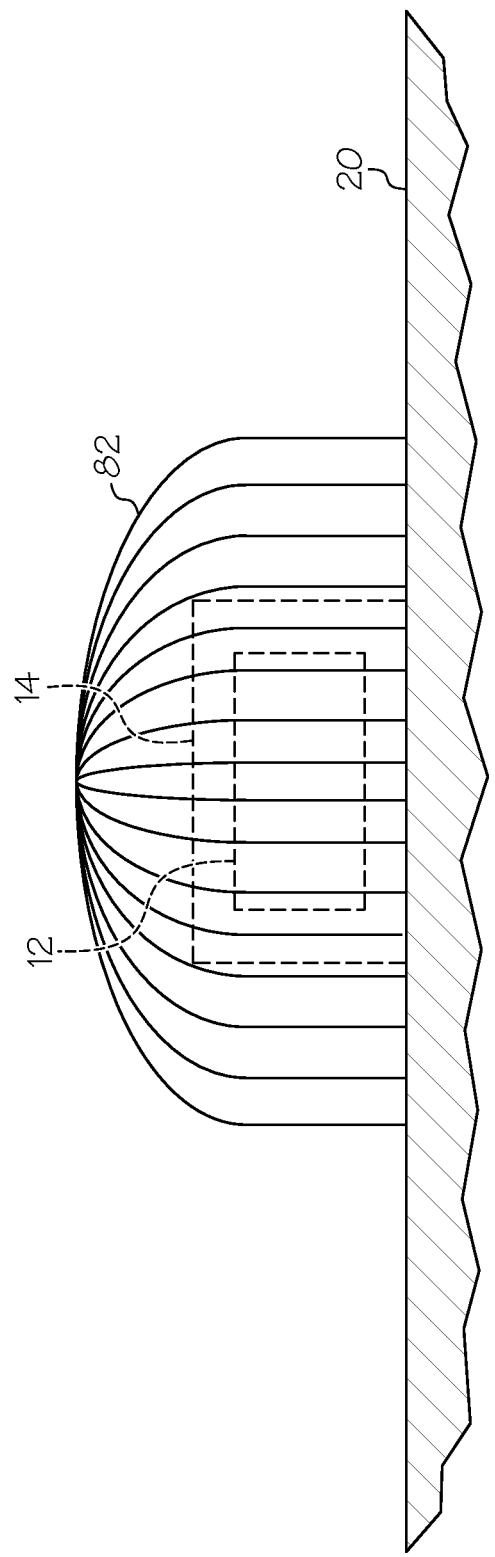
FIG. 8 is a schematic side elevational view of a support structure for supporting the secondary containment layer over the primary containment layer.
Figure 9:
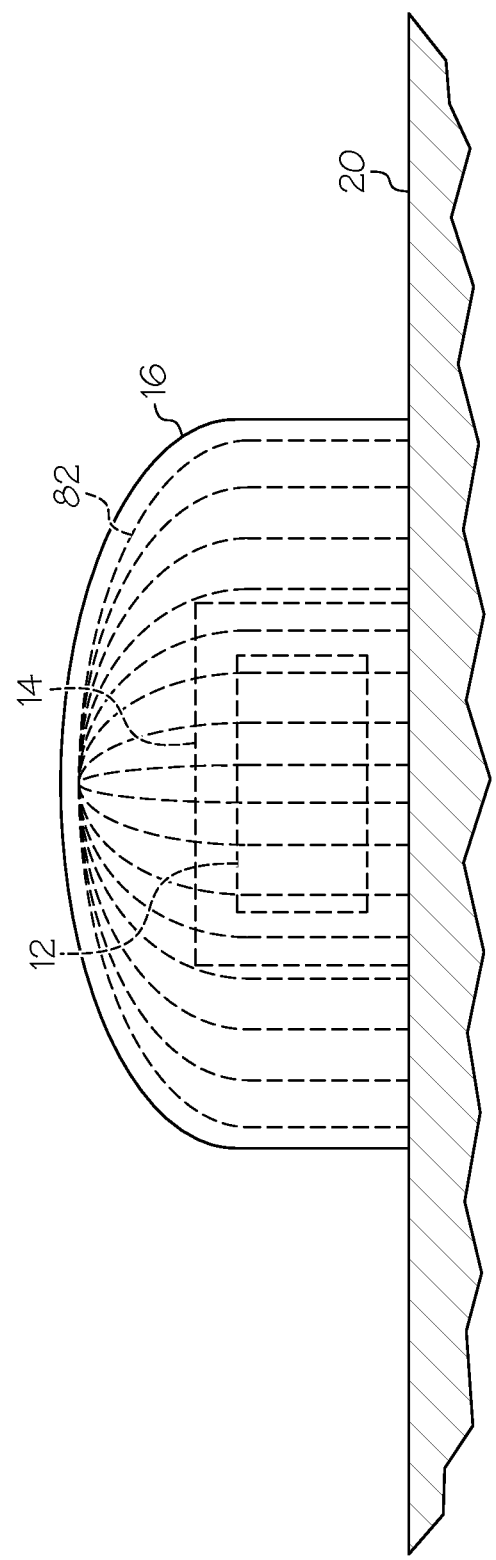
FIG. 9 is a schematic side elevational view of the secondary containment layer positioned over the support structure of FIG. 8.

Referring to FIGS. 8 and 9, the secondary containment layer 16 (FIG. 9) may be positioned over a support structure 82. The support structure 82 may be constructed as a framework having the configuration desired for the secondary containment layer 16. For example, the support structure 82 may be a metal framework that will not impede the transfer of gases from the high energy density device 12 to the secondary containment layer 16.

Thus, when the secondary containment layer 16 is not sufficiently inherently rigid, the secondary containment layer 16 may be draped over the support structure 82.

Therefore, the support structure 82 may support the weight of the secondary containment layer 16 and the secondary containment layer 16 may assume the shape of the support structure 82.

Referring back to FIG. 1, the high energy density device 12, the primary containment layer 14 and the secondary containment layer 16 may be enclosed within the tertiary containment layer 18. Therefore, the high energy density device 12, the primary containment layer 14 and the secondary containment layer 16 may occupy a portion of the tertiary containment volume 24 defined by the tertiary containment layer 18. However, the tertiary containment volume 24 may be greater than the volume of space occupied by the high energy density device 12, the primary containment layer 14 and the secondary containment layer 16, thereby leaving an air space 27 between the secondary containment layer 16 and the tertiary containment layer 18.

Optionally, one or more sensors 29 may be positioned to sense the air space 27 of the tertiary containment layer 18. As one example, the sensor 29 may be a gas sensor, such as a hydrogen sensor, a carbon dioxide sensor, a carbon monoxide sensor and/or a hydrocarbon sensor. As another example, the sensor 29 may be a temperature sensor. As yet another example, the sensor 29 may be a pressure sensor.

The tertiary containment layer 18 may assume various configurations. As shown in FIG. 1, in one particular configuration, the tertiary containment layer 18 may be constructed as a dome supported on the base structure 20. While the dome-shaped tertiary containment layer 18 is shown in FIG. 1 with an arched cross-section, various alternative cross-sections are contemplated, such as circular (e.g., a hemispherical dome). Without being limited to any particular theory, a dome-shaped tertiary containment layer 18 may have greater ballistic integrity than a tertiary containment layer 18 having another non-dome configuration. That said, constructing the tertiary containment layer 18 into a non-dome configuration would not result in a departure from the scope of the present disclosure.

The tertiary containment layer 18 may be formed from (or may include) a ballistic material. Therefore, the tertiary containment layer 18 may be resistant to puncture by matter moving at relatively high velocities. As such, the tertiary containment layer 18 may function to contain particles emanating from the high energy density device 12.

In a first implementation, the ballistic material of the tertiary containment layer 18 may be (or may include) a dilatant material. Therefore, the tertiary containment layer 18 may be relatively soft, flexible and lightweight. However, upon impact by a moving particle, the dilatant material in the tertiary containment layer 18 may undergo shear thickening, thereby presenting the particle with a rigid surface capable of dispersing the energy from the impact.

Various dilatant materials may be used as the ballistic material of the tertiary containment layer 18 without departing from the scope of the present disclosure. One non-limiting example of a suitable dilatant material is D3O® dilatant material commercially available from D3O Lab of East Sussex, United Kingdom. Another non-limiting example of a suitable dilatant material is ARMOURGEL® energy absorbing material commercially available from Armourgel Limited of the United Kingdom.

Dilatant materials may flow when not under stress. Therefore, incorporating a dilatant material into the tertiary containment layer 18 of the disclosed containment system 10 may require supporting the dilatant material on (or in) a substrate. Various techniques may be used to support a dilatant material without departing from the scope of the present disclosure.

Figure 10:
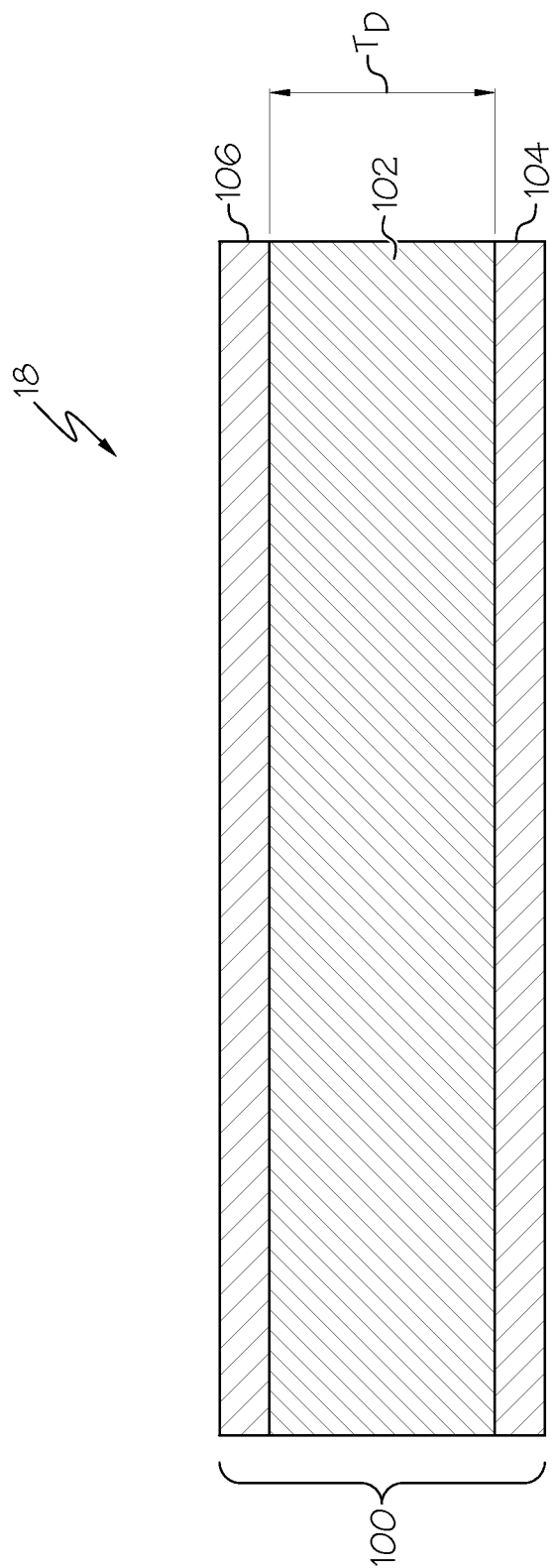
FIG. 10 is a cross-sectional view of one aspect of the tertiary containment layer of the containment system of FIG. 1.

Referring to FIG. 10, in one expression of the first implementation, the tertiary containment layer 18 is formed as a layered structure 100 that includes a dilatant material 102, a first liner layer 104 and, optionally, a second liner layer 106. The dilatant material layer 102 is positioned between the first liner layer 104 and the optional second liner layer 106.

The first and second liner layers 104, 106 may be formed from various substrate materials. Functionally, the first and second liner layers 104, 106 may support the dilatant material 102 within the layered structure 100, thereby inhibiting flow of the dilatant material and maintaining the layered configuration of the layered structure 100. As one general, non-limiting example, the first and second liner layers 104, 106 may be (or may include) a fabric, such as a ballistic fabric. As one specific, non-limiting example, the first and second liner layers 104, 106 may be (or may include) KEVLAR® para-aramid synthetic fabric, commercially available from E. I. du Pont de Nemours and Company of Wilmington, Del. As another specific, non-limiting example, the first and second liner layers 104, 106 may be (or may include) ballistic nylon.

The cross-sectional thickness TD of the dilatant material layer 102 may be a design consideration and may be dictated by various factors, such as the composition of the dilatant material layer 102, the type of high energy density device 12 (FIG. 1) being used, and the overall size of the containment system 10, among other possible factors. For example, the cross-sectional thickness TD of the dilatant material layer 102 may range from about 0.1 cm to about 10 cm, such as from about 0.5 cm to about 5 cm, or from about 1 cm to about 3 cm.

Additional layers may be included within the layered structure 100 of the tertiary containment layer 18 without departing from the scope of the present disclosure. For example, in one variation, the layered structure 100 may include multiple, alternating layers of dilatant material and liner material.

Optionally, the layered structure 100 of the tertiary containment layer 18 may be quilted. Quilting of the layered structure 100 may contain the dilatant material 102 within a plurality of pockets defined by the first and second liner layers 104, 106, thereby inhibiting flow of the dilatant material 102 and retaining the overall configuration of the layered structure 100.

In a second implementation, the ballistic material of the tertiary containment layer 18 may be (or may include) a ballistic fabric. Therefore, the tertiary containment layer 18 may be relatively soft, flexible and lightweight, yet may inhibit passage of moving particles therethrough.

Figure 11:
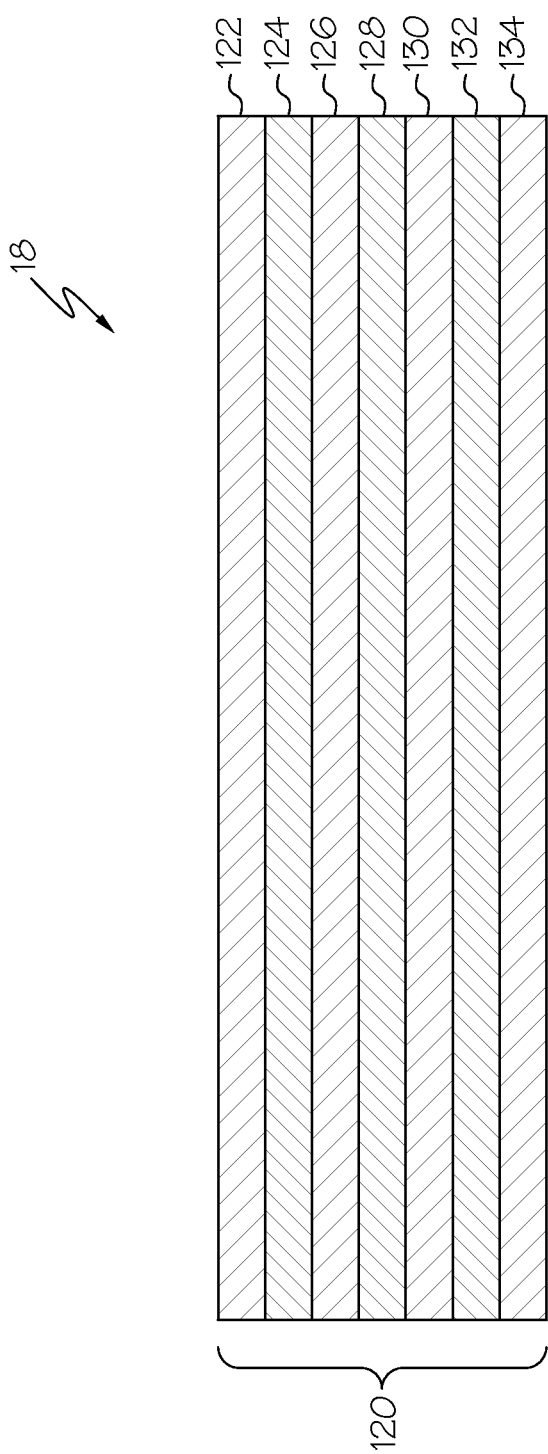
FIG. 11 is a cross-sectional view of another aspect of the tertiary containment layer of the containment system of FIG. 1.

Referring to FIG. 11, in one expression of the second implementation, the tertiary containment layer 18 may be formed as a layered structure 120 that includes a plurality of ballistic fabric layers 122, 124, 126, 128, 130, 132, 134. Each ballistic fabric layer 122, 124, 126, 128, 130, 132, 134 of the layered structure 120 may have the same composition. Alternatively, at least one layer (e.g., layers 124, 128, 132) of the layered structure 120 may be different from the other layers (e.g., layers 122, 126, 130, 134).

Thus, the tertiary containment layer 18 may be formed as a multi-ply structure. However, using a single-ply tertiary containment layer 18 is also contemplated and will not result in a departure from the scope of the present disclosure.

Various ballistic fabrics (or combinations of ballistic fabrics) may be used to construct the tertiary containment layer 18. One non-limiting example of a ballistic fabric useful in forming the layered structure 120 is KEVLAR® para-aramid synthetic fabric. Another non-limiting example of a ballistic fabric useful in forming the layered structure 120 is CORDURA® ballistic fabric commercially available from Invista North America S.a r.l. of Luxembourg. Yet another non-limiting example of a ballistic fabric useful in forming the layered structure 120 is SPECTRA® fiber fabric commercially available from Honeywell Advanced Fibers and Composites of Colonial Heights, Va.

Figure 12:
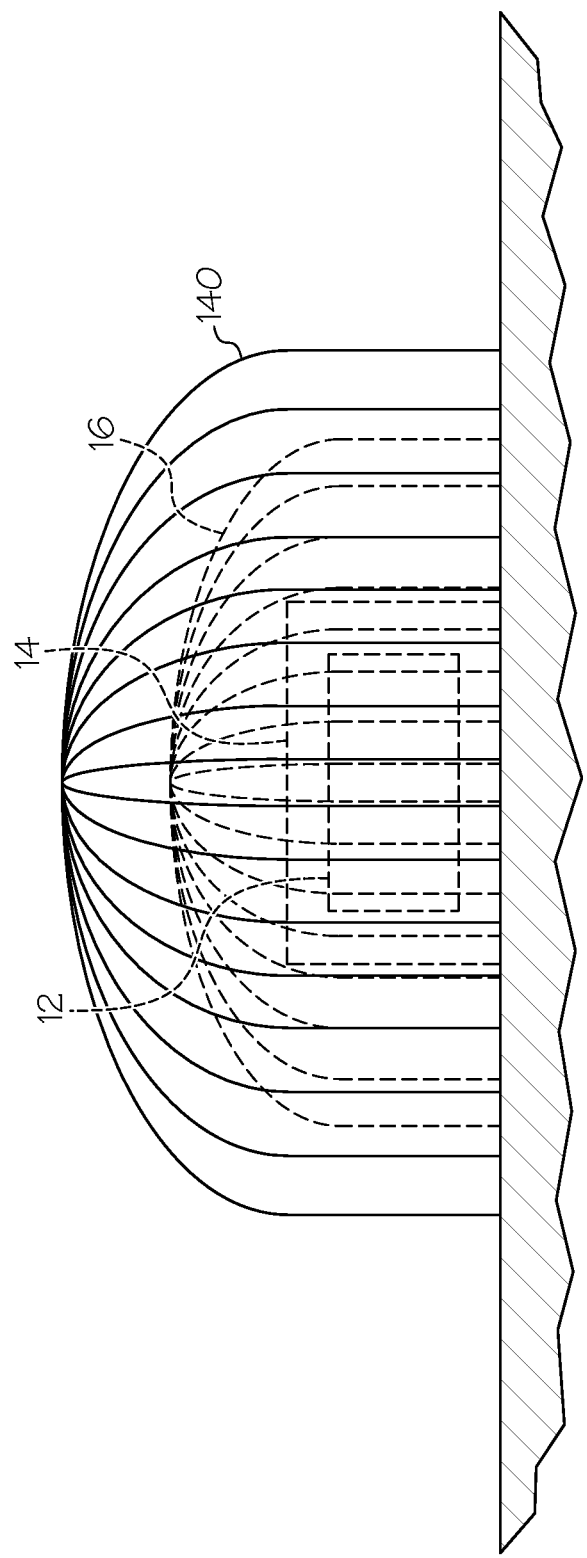
FIG. 12 is a schematic side elevational view of a support structure for supporting the tertiary containment layer over the secondary containment layer.
Figure 13:
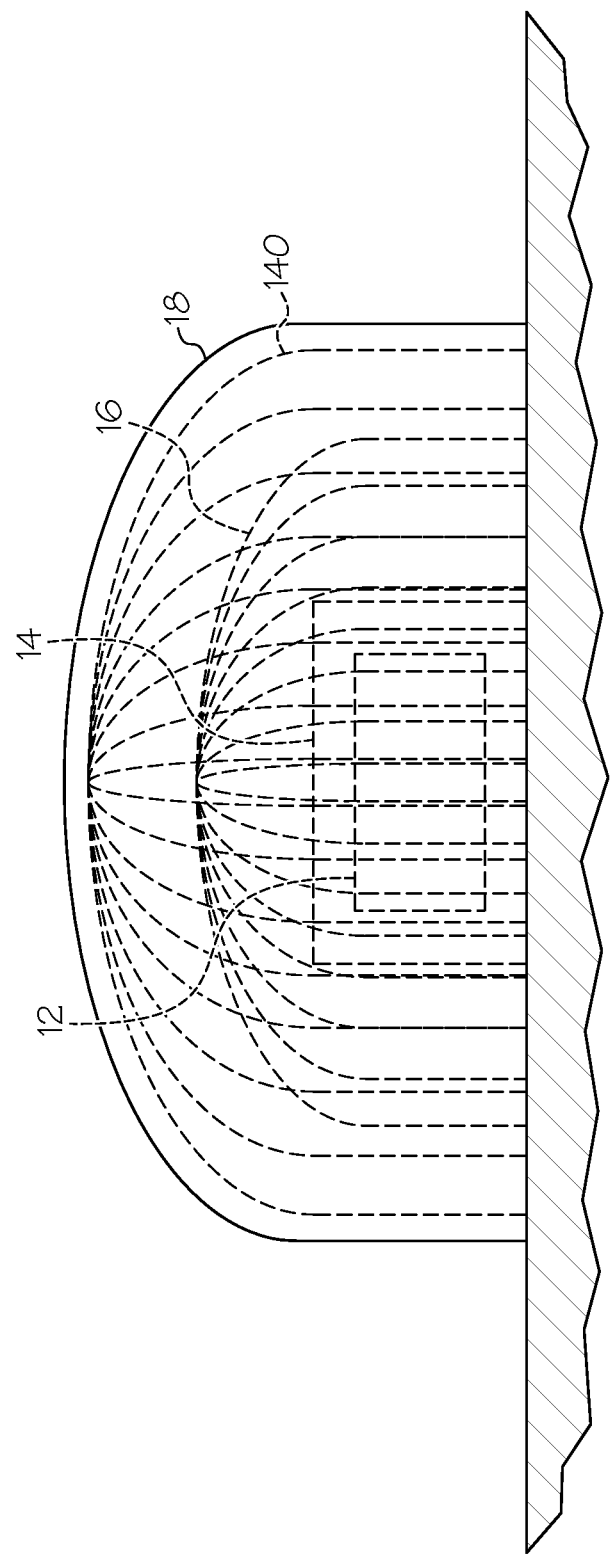
FIG. 13 is a schematic side elevational view of the tertiary containment layer positioned over the support structure of FIG. 12.

Referring to FIGS. 12 and 13, the tertiary containment layer 18 (FIG. 13) may be positioned over a support structure 140. The support structure 140 may be constructed as a framework having the configuration desired for the tertiary containment layer 18. For example, the support structure 140 may be a metal framework capable of supporting the weight of the tertiary containment layer 18.

Thus, when the tertiary containment layer 18 is not sufficiently inherently rigid, the tertiary containment layer 18 may be draped over the support structure 140. Therefore, the support structure 140 may support the weight of the tertiary containment layer 18 and the tertiary containment layer 18 may assume the shape of the support structure 140.

Accordingly, the disclosed containment system 10 may include multiple containment layers (the primary containment layer 14, the secondary containment layer 16 and the tertiary containment layer 18). Each containment layer 14, 16, 18 of the containment system 10 may contribute to the containment system 10 at least one particular functionality. Therefore, when a high energy density device 12 is contained with the containment system 10, heat, gases, liquids and/or solids emanating from the high energy density device 12 may be contained within the containment system 10. The containment system 10 may be sized relative to the high energy density device 12 such that there is little or no need to vent to the atmosphere (e.g., the high energy density device 12 may be fully enclosed within the containment system 10).

Figure 14:
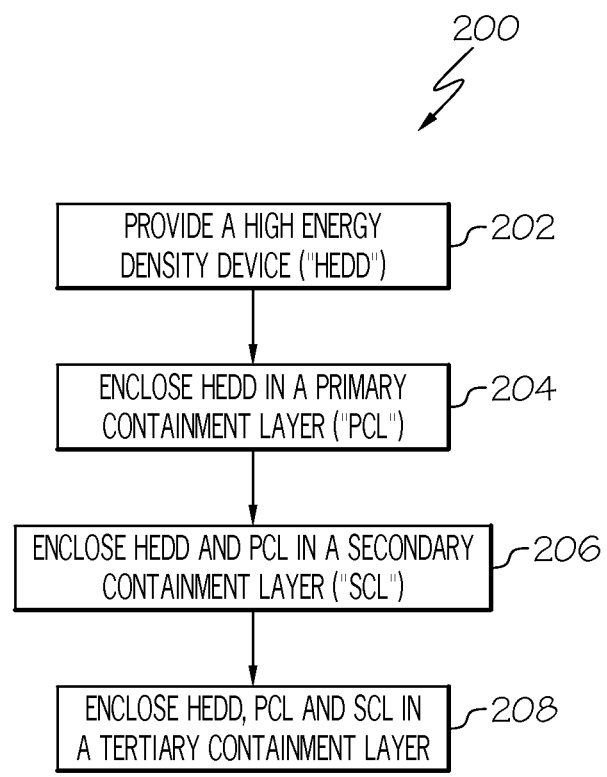
FIG. 14 is a flow diagram depicting one embodiment of the disclosed containment method for high energy density devices.

Also disclosed is a containment method for high energy density devices. Referring to FIG. 14, one embodiment of the disclosed method, generally designated 200, may be begin at Block 202 with the step of providing a high energy density device 12 (FIG. 1). As one non-limiting example, the high energy density device 12 may be a battery, such as a lithium-ion battery. As another non-limiting example, the high energy density 12 device may be a fuel cell.

At Block 204, the high energy density device 12 (FIG. 1) may be at least partially enclosed within a primary containment layer 14 (FIG. 1). The primary containment layer 14 may include a thermal material, such as a phase change material 42 (FIG. 4). Therefore, by enclosing the high energy density device 12 within the primary containment layer 14, heat emanating from the high energy density device 12 may be transferred to the thermal material 42 of the primary containment layer 14.

At Block 206, the high energy density device 12 (FIG. 1) and the primary containment layer 14 (FIG. 1) may be at least partially enclosed within a secondary containment layer 16 (FIG. 1). The secondary containment layer 16 may include a gas capturing material 72 (FIG. 7). Therefore, by enclosing the high energy density device 12 within the secondary containment layer 16, gases emanating from the high energy density device 12 may be contained by the gas capturing material 72 of the secondary containment layer 16.

At Block 208, the high energy density device 12 (FIG. 1), the primary containment layer 14 (FIG. 1) and the secondary containment layer 16 (FIG. 1) may be at least partially enclosed within a tertiary containment layer 18 (FIG. 1). The tertiary containment layer 18 may include a ballistic material, such as a dilatant material 102 (FIG. 10). Therefore, by enclosing the high energy density device 12 within the tertiary containment layer 18, particles emanating from the high energy density device 12 may be contained by the ballistic material 102 of the tertiary containment layer 18.

Accordingly, the disclosed method 200 may enclose a high energy density device 12 (FIG. 1) within multiple containment layers, wherein each containment layer has at least one particular functionality. Therefore, heat, gases, and/or particles emanating from the high energy density device 12 may be contained by the respective layers.

Figure 15:
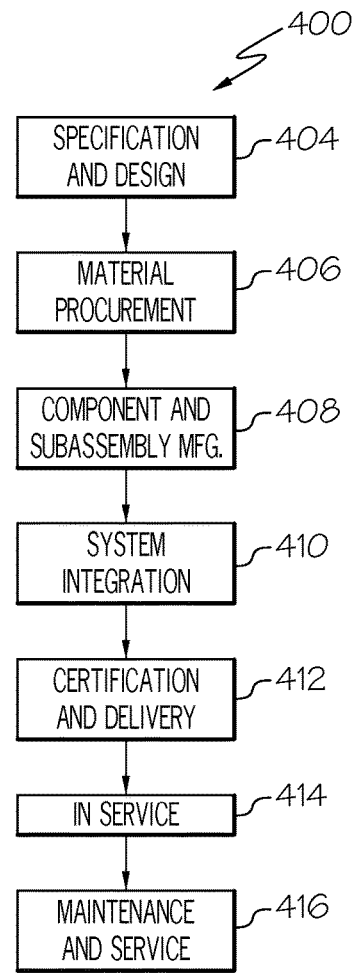
FIG. 15 is a flow diagram of an aircraft manufacturing and service methodology.
Figure 16:
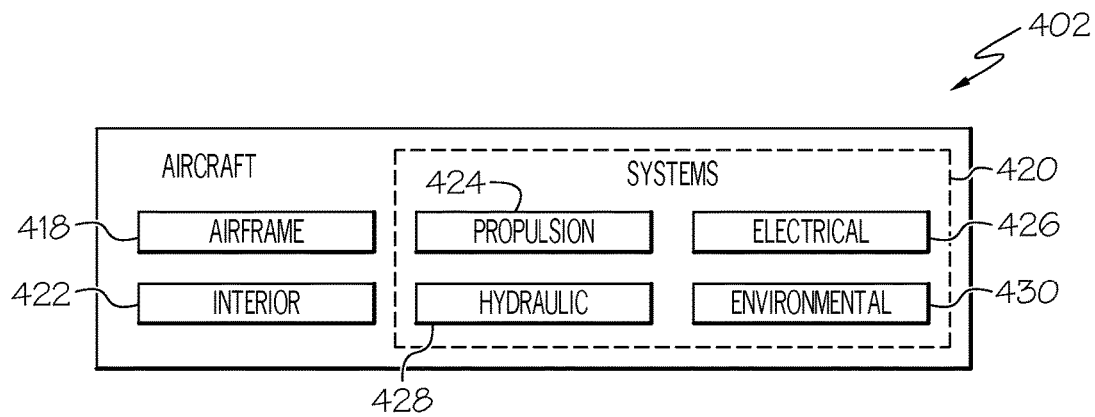
FIG. 16 is a block diagram of an aircraft.

Examples of the disclosed containment system 10 and method 200 may be described in the context of an aircraft manufacturing and service method 400, as shown in FIG. 15, and an aircraft 402, as shown in FIG. 16. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 16, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. The disclosed containment system 10 may be incorporated into various systems 420 of the aircraft 402, such as the electrical system 426 and/or the environmental system 430.

The disclosed containment system 10 and method 200 may be employed during any one or more of the stages of the aircraft manufacturing and service method 400. For example, components or subassemblies corresponding to component/subassembly manufacturing 408, system integration 410, and or maintenance and service 416 may be fabricated or manufactured using the disclosed containment system 10. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed containment system 10 and method 200 are described in the context of an aircraft; however, one of ordinary skill in the art will readily recognize that the disclosed service system may be utilized for a variety of different components for a variety of different types of vehicles. As one example, implementations of the embodiments described herein may be implemented in any type of vehicle including, e.g., helicopters, passenger ships, automobiles and the like. As another example, the disclosed containment system 10 may be used when shipping or storing batteries.

Further, the disclosure comprises embodiments according to the following clauses:

Clause 1. A containment system comprising a primary containment layer at least partially defining a primary containment volume, said primary containment layer comprising a thermal material; a secondary containment layer at least partially defining a secondary containment volume, said secondary containment layer comprising a gas capturing material, wherein said primary containment layer is positioned in said secondary containment volume; and a tertiary containment layer at least partially defining a tertiary containment volume, said tertiary containment layer comprising a ballistic material, wherein said secondary containment layer is positioned in said tertiary containment volume.

Clause 2. The containment system of Clause 1 further comprising a high energy density device, wherein said high energy density device is a least partially positioned in said primary containment volume.

Clause 3. The containment system of Clause 2 wherein said high energy density device comprises a battery.

Clause 4. The containment system of Clause 3 wherein said battery is a lithium-ion battery.

Clause 5. The containment system of Clause 2 wherein said high energy density device comprises a fuel cell.

Clause 6. The containment system of Clause 2 wherein said high energy density device comprises a plurality of subunits, wherein said primary containment layer comprises a plurality of primary containment units, and wherein each subunit of said plurality of subunits is at least partially positioned in an associated primary containment unit of said plurality of primary containment units.

Clause 7. The containment system of Clause 2 wherein said high energy density device is closely received within said primary containment layer.

Clause 8. The containment system of Clause 1 further comprising a base structure, wherein said secondary containment layer is connected to said base structure to define said secondary containment volume, and wherein said tertiary containment layer is connected to said base structure to define said tertiary containment volume.

Clause 9. The containment system of Clause 1 wherein said primary containment layer is configured as one of a sleeve, a wrap and a container.

Clause 10. The containment system of Clause 1 wherein said thermal material comprises a polymer.

Clause 11. The containment system of Clause 10 wherein said polymer is a thermoplastic polymer having a glass transition temperature of at least 100° C.

Clause 12. The containment system of Clause 10 wherein said polymer is a thermoplastic polymer having a glass transition temperature of at least 125° C.

Clause 13. The containment system of Clause 10 wherein said polymer comprises a polyaryletherketone.

Clause 14. The containment system of Clause 10 wherein said polymer is selected from the group consisting of polyetheretherketone, polyetherketoneketone, polyetherketone, polyetherketoneetherketoneketone, polyetherimide, and combinations thereof.

Clause 15. The containment system of Clause 10 wherein said polymer comprises silicone.

Clause 16. The containment system of Clause 1 wherein said thermal material comprises a phase change material.

Clause 17. The containment system of Clause 16 wherein said phase change material is a solid-to-liquid phase change material.

Clause 18. The containment system of Clause 16 wherein said phase change material is selected from the group consisting of paraffin, fatty acid, phenol, beeswax, quinone, benzoic acid, p-xylene dichloride, sodium silicate, lithium, sodium chloride, and combinations thereof.

Clause 19. The containment system of Clause 16 wherein said primary containment layer further comprises a carrier, and wherein said thermal material is supported by said carrier.

Clause 20. The containment system of Clause 19 wherein said carrier defines a plurality of pockets, and wherein said thermal material is received in said plurality of pockets.

Clause 21. The containment system of Clause 19 wherein said carrier comprises a polymeric film.

Clause 22. The containment system of Clause 19 wherein said carrier comprises a framework constructed from at least one of a metal and a metal oxide.

Clause 23. The containment system of Clause 19 wherein said carrier comprises a metal oxide impregnated with said thermal material.

Clause 24. The containment system of Clause 1 wherein said secondary containment layer is dome-shaped.

Clause 25. The containment system of Clause 1 wherein said secondary containment layer comprises a layered structure, and wherein said gas capturing material is incorporated into said layered structure.

Clause 26. The containment system of Clause 25 wherein layered structure comprises a gas permeable layer and a gas impermeable layer, and wherein said gas capturing material is positioned between said gas permeable layer and said gas impermeable layer.

Clause 27. The containment system of Clause 26 wherein said gas permeable layer comprises a fabric.

Clause 28. The containment system of Clause 27 wherein said fabric comprises metal oxide fibers.

Clause 29. The containment system of Clause 27 wherein said gas impermeable layer comprises a polymeric material.

Clause 30. The containment system of Clause 1 wherein said gas capturing material comprises an adsorbent.

Clause 31. The containment system of Clause 30 wherein said adsorbent comprises at least one of a metal-organic framework and a zeolite.

Clause 32. The containment system of Clause 30 wherein said adsorbent comprises at least one of a hydrogen-selective adsorbent, a carbon dioxide-selective adsorbent and a hydrocarbon-selective adsorbent.

Clause 33. The containment system of Clause 1 wherein said gas capturing material comprises an absorbent.

Clause 34. The containment system of Clause 1 further comprising a support structure, wherein said secondary containment layer is supported by said support structure.

Clause 35. The containment system of Clause 1 further comprising a sensor positioned in said secondary containment volume.

Clause 36. The containment system of Clause 1 wherein said tertiary containment layer is dome-shaped.

Clause 37. The containment system of Clause 1 wherein said ballistic material comprises a dilatant material.

Clause 38. The containment system of Clause 37 wherein said tertiary containment layer comprises a layered structure, and wherein said dilatant material is incorporated into said layered structure.

Clause 39. The containment system of Clause 38 wherein layered structure comprises at least one liner layer, and wherein said liner layer is applied to said dilatant material.

Clause 40. The containment system of Clause 39 wherein said liner layer comprises a ballistic fabric.

Clause 41. The containment system of Clause 39 wherein said layered structure is quilted.

Clause 42. The containment system of Clause 1 wherein said ballistic material comprises a ballistic fabric.

Clause 43. The containment system of Clause 42 wherein said ballistic fabric is a multi-ply structure.

Clause 44. The containment system of Clause 42 wherein said ballistic fabric comprises a para-aramid synthetic fabric.

Clause 45. The containment system of Clause 1 further comprising a support structure, wherein said tertiary containment layer is supported by said support structure.

Clause 46. The containment system of Clause 1 further comprising a sensor positioned in said tertiary containment volume.

Clause 47. A containment system comprising a primary containment layer at least partially defining a primary containment volume, wherein said primary containment layer comprises a phase change material and a carrier, wherein said phase change material is supported by said carrier; a secondary containment layer at least partially defining a secondary containment volume, wherein said primary containment layer is positioned in said secondary containment volume, and wherein said secondary containment layer comprises a gas permeable layer, a gas impermeable layer and a gas capturing material positioned between said gas permeable layer and said gas impermeable layer; and a tertiary containment layer at least partially defining a tertiary containment volume, wherein said secondary containment layer is positioned in said tertiary containment volume, and wherein said tertiary containment layer comprises a liner material and a dilatant material connected to said liner material.

Clause 48. The containment system of Clause 47 wherein said carrier comprises a metal oxide impregnated with said phase change material.

Clause 49. The containment system of Clause 47 wherein said gas capturing material comprises an adsorbent.

Clause 50. A containment system comprising a primary containment layer at least partially defining a primary containment volume, said primary containment layer comprising a thermal material, and a high energy density device at least partially received in said primary containment volume.

Clause 51. The containment system of Clause 50 further comprising a secondary containment layer at least partially defining a secondary containment volume, wherein said primary containment layer is positioned in said secondary containment volume, said secondary containment layer comprising a gas capturing material.

Clause 52. The containment system of Clause 50 further comprising a tertiary containment layer at least partially defining a tertiary containment volume, said tertiary containment layer comprising a ballistic material, wherein said primary containment layer is positioned in said tertiary containment volume.

Clause 53. A containment system comprising a secondary containment layer at least partially defining a secondary containment volume, said secondary containment layer comprising a gas capturing material, and a high energy density device at least partially received in said secondary containment volume.

Clause 54. The containment system of Clause 53 further comprising a tertiary containment layer at least partially defining a tertiary containment volume, said tertiary containment layer comprising a ballistic material, wherein said secondary containment layer is positioned in said tertiary containment volume.

Clause 55. A containment method comprising providing a high energy density device; enclosing, at least partially, said high energy density device within a primary containment layer comprising a thermal material; enclosing said primary containment layer within a secondary containment layer comprising a gas capturing material; and enclosing said secondary containment layer within a tertiary containment layer comprising a ballistic material.

Although various embodiments of the disclosed containment system and method for high energy density devices have been shown and described, modifications may occur to those skilled in the art upon reading the specification. The present application includes such modifications and is limited only by the scope of the claims.

What is claimed is:

1. A containment system comprising:
   a primary containment layer at least partially defining a primary containment volume configured to at least partially receive a high energy density device, said primary containment layer comprising a thermal material;
   a secondary containment layer at least partially defining a secondary containment volume, said secondary containment layer comprising a layered structure and a gas capturing material incorporated into said layered structure, wherein said gas capturing material comprises at least one of an adsorbent and an absorbent, and wherein said primary containment layer is positioned in said secondary containment volume; and
   a tertiary containment layer at least partially defining a tertiary containment volume, said tertiary containment layer comprising a ballistic material, wherein said secondary containment layer is positioned in said tertiary containment volume to define an air space between said secondary containment layer and said tertiary containment layer, and wherein said secondary containment layer fluidly isolates said secondary containment volume from said air space.

2. The containment system of claim 1 comprising said high energy density device.

3. The containment system of claim 2 wherein said high energy density device comprises one of a battery and a fuel cell.

4. The containment system of claim 2 wherein said high energy density device comprises a plurality of subunits, wherein said primary containment layer comprises a plurality of primary containment units, and wherein each subunit of said plurality of subunits is at least partially positioned in an associated primary containment unit of said plurality of primary containment units.

5. The containment system of claim 1 further comprising a base structure, wherein said secondary containment layer is connected to said base structure to define said secondary containment volume, and wherein said tertiary containment layer is connected to said base structure to define said tertiary containment volume.

6. The containment system of claim 1 wherein said primary containment layer is configured as one of a sleeve, a wrap and a container.

7. The containment system of claim 1 wherein said thermal material comprises a polymer.

8. The containment system of claim 7 wherein said polymer is a thermoplastic polymer having a glass transition temperature of at least 100° C.

9. The containment system of claim 7 wherein said polymer is a thermoplastic polymer having a glass transition temperature of at least 125° C.

10. The containment system of claim 7 wherein said polymer is selected from the group consisting of polyetheretherketone, polyetherketoneketone, polyetherketone, polyetherketoneetherketoneketone, polyetherimide, and combinations thereof.

11. The containment system of claim 7 wherein said polymer comprises silicone.

12. The containment system of claim 1 wherein said thermal material comprises a phase change material.

13. The containment system of claim 12 wherein said phase change material is a solid-to-liquid phase change material.

14. The containment system of claim 12 wherein said phase change material is selected from the group consisting of paraffin, fatty acid, phenol, beeswax, quinone, benzoic acid, p-xylene dichloride, sodium silicate, lithium, sodium chloride, and combinations thereof.

15. The containment system of claim 12 wherein said primary containment layer further comprises a carrier, and wherein said thermal material is supported by said carrier.

16. The containment system of claim 15 wherein said carrier defines a plurality of pockets, and wherein said thermal material is received in said plurality of pockets.

17. The containment system of claim 15 wherein said carrier comprises a polymeric film.

18. The containment system of claim 15 wherein said carrier comprises a framework constructed from at least one of a metal and a metal oxide.

19. The containment system of claim 15 wherein said carrier comprises a metal oxide impregnated with said thermal material.

20. The containment system of claim 1 wherein layered structure comprises a gas permeable layer and a gas impermeable layer, and wherein said gas capturing material is positioned between said gas permeable layer and said gas impermeable layer.

21. The containment system of claim 20 wherein said gas permeable layer comprises a fabric.

22. The containment system of claim 21 wherein said fabric comprises metal oxide fibers.

23. The containment system of claim 20 wherein said gas impermeable layer comprises a polymeric material.

24. The containment system of claim 1 wherein said gas capturing material comprises said adsorbent.

25. The containment system of claim 24 wherein said adsorbent comprises at least one of a metal-organic framework and a zeolite.

26. The containment system of claim 24 wherein said adsorbent comprises at least one of a hydrogen-selective adsorbent, a carbon dioxide-selective adsorbent and a hydrocarbon-selective adsorbent.

27. The containment system of claim 1 wherein said gas capturing material comprises said absorbent.

28. The containment system of claim 1 further comprising a support structure, wherein said secondary containment layer is supported by said support structure.

29. The containment system of claim 1 further comprising a sensor positioned in said secondary containment volume.

30. The containment system of claim 1 wherein said ballistic material comprises a dilatant material.

31. The containment system of claim 30 wherein said tertiary containment layer comprises a layered structure, and wherein said dilatant material is incorporated into said layered structure.

32. The containment system of claim 31 wherein layered structure comprises at least one liner layer, and wherein said liner layer is applied to said dilatant material.

33. The containment system of claim 32 wherein said liner layer comprises a ballistic fabric.

34. The containment system of claim 1 wherein said ballistic material comprises a ballistic fabric that is at least one of a multi-ply structure and a para-aramid synthetic fabric.

35. The containment system of claim 1 further comprising a support structure, wherein said tertiary containment layer is supported by said support structure.

36. The containment system of claim 1 further comprising a sensor positioned in said tertiary containment volume.

37. A containment system comprising:
a primary containment layer at least partially defining a primary containment volume configured to at least partially receive a high energy density device, wherein said primary containment layer comprises:
a phase change material; and
a carrier, wherein said phase change material is supported by said carrier;
a secondary containment layer at least partially defining a secondary containment volume, wherein said primary containment layer is positioned in said secondary containment volume, and wherein said secondary containment layer comprises:
a gas permeable layer;
a gas impermeable layer; and
a gas capturing material positioned between said gas permeable layer and said gas impermeable layer, wherein said gas capturing material comprises at least one of an adsorbent and an absorbent; and
a tertiary containment layer at least partially defining a tertiary containment volume, wherein said secondary containment layer is positioned in said tertiary containment volume to define an air space between said secondary containment layer and said tertiary containment layer, wherein said secondary containment layer fluidly isolates said secondary containment volume from said air space, and wherein said tertiary containment layer comprises:
a liner material; and
a dilatant material connected to said liner material.

38. The containment system of claim 37 wherein said carrier comprises a metal oxide impregnated with said phase change material.

39. The containment system of claim 37 wherein said gas capturing material comprises said adsorbent.

* * * * *